April 3, 1962    S. LEUSCHKE ET AL    3,027,800
MOTION PICTURE CAMERA WITH TIMING MECHANISM
Filed July 16, 1958
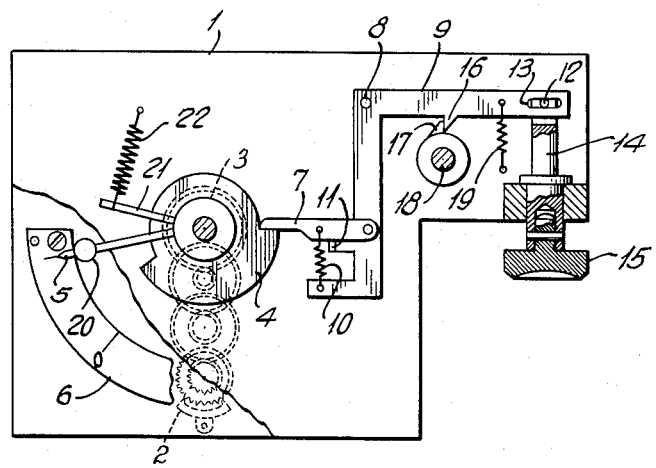
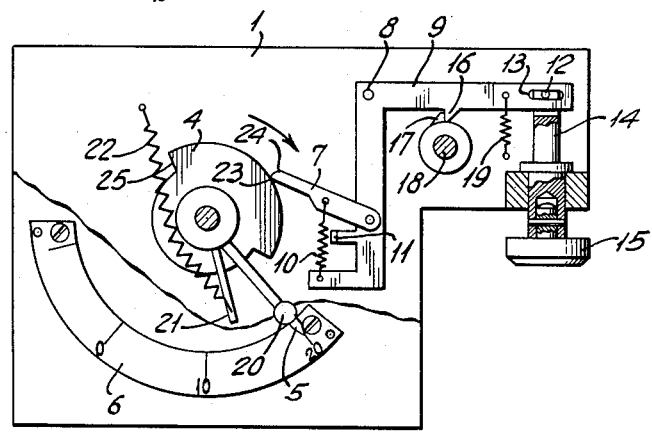
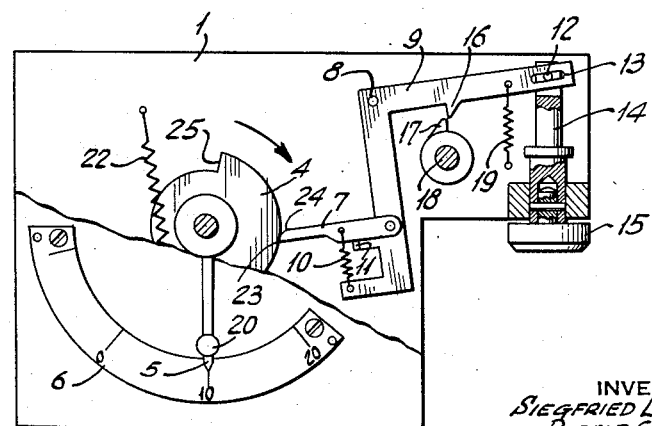
INVENTORS
SIEGFRIED LEUSCHKE
RUDOLF GRÖTZSCHEL
BY
ATTORNEY

3,027,800
MOTION PICTURE CAMERA WITH TIMING MECHANISM

Siegfried Leuschke and Rudolf Grötzschel, Dresden, Germany, assignors to VEB Kamera- und Kinowerke Dresden
Filed July 16, 1958, Ser. No. 748,871
15 Claims. (Cl. 88—16)

The present invention relates to a kinematograph camera equipped with a delayed exposure mechanism and with a device for stopping the camera movement after a predetermined running time, and more particularly to a mechanism which controls both the time for delay in starting the camera drive and a preset running time.

Control device in moving picture cameras for merely stopping the camera drive after a predetermined running time are already known. Such prior control devices are actuated, for example, by a footage counter and are adapted to act upon a stopping element. However, formerly, to start the camera drive mechanism after a preset release delay time, such as may be desired for the photographer to take pictures of himself and to get into the picture field before the camera drive is released, a separate release delay mechanism had to be provided. According to the present invention, a compact and unitary arrangement, simpler than those of the prior art, can be achieved by adapting a single mechanism for controlling the time delay for starting or release of the drive as well as for controlling the preset running time.

It is therefore an object of the present invention to provide a device for delaying the release of a motion picture camera exposure and film drive mechanism a predetermined amount of elapsed time, while simultaneously providing a variable setting for the running time or footage of film to be exposed before the drive is stopped.

Other objects and many of the attendant advantages of this invention will be readily appreciated as the same becomes better understood by reference to the following detailed description when considered in connection with the accompanying drawings, in which like reference numerals designate like parts throughout the figures thereof, and wherein:

FIG. 1 is an elevation view, partly cut away and partly in section, of a portion of a motion picture camera showing one embodiment of the device of the present invention, and FIGS. 2 and 3 show the device of FIG. 1 in different operative positions.

In a preferred embodiment of the present invention, the drive wheel of an escapement mechanism is provided with a cam segment having a roughened cam surface which frictionally entrains a lever to actuate the release mechanism after the duration of a first part of the cam segment's running cycle (corresponding to the release delay time) and the actuated lever is thereby positioned for release of the camera film drive and exposure, whereas during the second portion of the running cycle of the cam segment (which corresponds to the selected variable running time set for the camera) the lever slides along the surface of the cam without changing its position and finally drops into a recess behind the cam segment, whereby the camera drive is again stopped.

Referring now to the drawings, there is shown a mounting plate 1 of a motion picture camera, on which is rotatably mounted an escapement mechanism 2, connected by suitable means, such as, for example, a gear train, to cam drive wheel 3. A tension spring 22, having one end fastened to plate 1 and the other end fastened to a lever 21 on drive wheel 3, provides the turning force for drive wheel 3. Wheel 3 carries thereon a cam segment 4, which is connected to a pointer 5. The pointer 5 having a knob 20 affixed thereto is arranged to move across a scale 6, located on the outside casing of the camera. Scale 6 may be calibrated in seconds of camera running time desired, as shown, or in footage of film. A lever 7 is positioned to be actuated by the cam segment 4. The free end of lever 7 is formed so as to have a sharp corner 23 at its lower side blending into a rounded corner 24 on its upper side. The outer surface of cam segment 4 is roughened or knurled.

Lever 7 is pivotally mounted on an angle-shaped lever 9, which is rotatable about pin 8, pin 8 being fixed to mounting plate 1. A spring 10, fastened to angle-shaped lever 9, urges lever 7 towards a stop 11 arranged on the angle lever 9. A pin 13, slidably guided in a slot 12 of angle lever 9, is fastened to a bolt 14 which carries the release button 15.

Mounted on angle lever 9 is a latch 16 for engagement with an abutment dog 17 mounted on a shaft 18, the latter shaft being operably connected to the camera drive in a suitable manner not further illustrated. A spring 19, mounted on mounting plate 1, constantly urges angle lever 9 with its locking lug, latch 16, into a locked position to block abutment dog 17.

Operation of the device is an follows:
The starting position is illustrated in FIG. 1. In the starting position, the camera drive is blocked, since latch 16 abuts against the dog 17, restraining shaft 18 from rotating. Let it be assumed, for example, that a film running time of 20 seconds is desired after the constant release delay time has elapsed. Pointer 5, by means of handle or knob 20 attached thereto, is swung counterclockwise to the corresponding indicating mark of scale 6, the indicated mark in the present example being illustrated at the end of scale 6 in FIG. 2. The spring 22, acting through lever 21 upon segment 4 is thereby tensioned, and the pivotable lever 7, which abuts, at one end thereof, against the face of the cam segment 4 is thus brought into the tilted position illustrated in FIG. 2.

When the pointer 5 is manually released, the cam segment 4 starts rotating at a predetermined rate under the action of spring 22 and retarding influence of the escapement anchor of the escapement device 2. The roughened surface of cam segment 4 then entrains the sharp point or corner 23 of lever 7. This entrainment of lever 7 causes angle lever 9 to be rotated about pivot 8 in a counter-clockwise direction, so that the abutment means or dog 17 is finally released by the latch 16, thus permitting shaft 18, connected to the camera drive mechanism, to rotate, starting the film travel and exposure device of the camera. The overlapping length of latch 16 and dog 17 determines the delay time, since, as long as members 16 and 17 remain in sliding contact, the camera drive will remain blocked. As the cam segment 4 continues its clockwise rotation, the rounded surface 24 of the free end of lever 7 slides along the surface of cam segment 4, as illustrated in FIG. 3, until the end of the cam face is reached. Lever 7, pulled down by tension of spring 10, drops into recess 25, whereby angle lever 9, under tension of spring 19, is swung back clockwise to the locked position of FIG. 1, where latch 16 again engages and blocks abutment dog 17 and shaft 18, thus stopping the camera drive.

By suitable angular adjustment of pointer 5, any running time of the drive mechanism between predetermined lower and upper limits (for example 0 and 20 seconds, respectively) may be selected and set. The release or starting delay time, i.e., the elapsed time until the camera drive is released, remains constant with all settings.

Scale 6 may, of course, instead of in film running time also be calibrated in film footage length units, or the time scale calibration may be such that the time values represent the total of starting delay time plus running time.

Whenever it is desired not to use the delay timer, the camera drive is released by pressing release button 15. As long as button 15 remains depressed, latch 16 will be disengaged from abutment dog 17 to release the camera drive attached to shaft 18 and permit the drive to run. When manual pressure on release button 15 is removed, tension of spring 19 again pulls angle lever 9 and latch 16 back into the locking position to stop the drive.

Obviously, many modifications and variations of the present invention are possible in the light of the above teachings. It is therefore to be understood that within the scope of the appended claims the invention may be practiced otherwise as specifically described.

What is claimed is:

1. In combination with a motion picture camera, a time delay drive release and stopping device for stopping said drive after a pre-set running time; comprising escapement means for controlling both the time delay of said release and said running time, said escapement means including a drive wheel having a cam segment mounted thereon for rotation therewith, at least a portion of the cam surface of said cam segment being roughened for increased friction, blocking means for blocking and releasing the film drive of said camera, lever means operably connected to said blocking means, said lever means being formed and positioned for actuation by said cam segment, so as to move said blocking means to the releasing position during a first portion of the rotational cycle of said cam segment and to retain said blocking means in releasing position during a second portion of the rotational cycle of said cam segment, said cam segment having a recess in the cam surface thereof for actuating said lever to move said blocking means back into blocking position.

2. A device according to claim 1, said lever means including a pivotally mounted first lever having a latch affixed thereto; a second lever, pivotally linked to said first lever and having a free end positionable for contacting the surface of said cam, said blocking means including a latch fixedly attached to said first lever and abutment means positioned for blocking engagement by said latch and operably connected to the film drive of said camera.

3. In a motion picture camera, a device according to claim 2, and including manual drive release means operably connected to and for rotation of said angular lever to substantially instantaneously disengage said latch from said abutment means for starting the camera drive without time delay.

4. A device according to claim 2, wherein said first lever is provided with a stop, and spring means fastened to said first lever for urging said second lever against said stop.

5. In a motion picture camera, a device according to claim 2, and including a scale mounted on said camera, said scale having marked thereon calibrated values which are a function of running time and film length, spring drive means cooperating with said escapement means for driving said cam segment, and pointer means having one end positioned for moving across said scale said pointer being operably connected at the other end to said cam segment for tensioning said spring drive means for driving said cam segment.

6. A delay and timing device for an operating mechanism comprising a frame, actuating means on said frame gradually movable between stopping position and a starting position, an escapement secured to said frame having a preset and a rundown position, handle means for setting said escapement to the preset position, resilient return means connected to said escapement for runoff movement of said escapement to said rundown position, a cam secured to said escapement for movement thereby, a clutch surface on said cam, a cam follower secured to said actuating means for movement thereof, said cam follower being connected to said actuating means by a pivotal mount whereby said cam follower is ineffective to move said actuating means during movement of said escapement to the preset position, said cam follower having a cam surface and a clutch surface engageable with said cam, said cam follower being biased against said cam for engagement thereof during runoff for movement of said actuating means from the stopping position to the starting position, whereby pivotal movement of said follower produces engagement of said cam surface on said cam follower with said cam whereby said actuating means is maintained in the starting position.

7. In combination with a motion picture camera, a time delay drive release and stopping device comprising; a camera drive, drive blocking means, biasing means for urging said blocking means into the path of said drive to stop movement of the drive, said blocking means being movable from a blocking position through a blocking path of predetermined length to stop movement of the drive unitl a predetermined release position is reached, timing means for control of said blocking means including rotary means having a limit stop and a peripheral surface, means to urge said rotary means in a forward direction toward said limit stop, setting means to rotate said rotary means in a backward direction and to rotatably set said rotary means at a predetermined angular position for permitting rotation of said rotary means by said urging means through a selected angle to said limit stop, unidirectional clutch means engaging said rotary means at the peripheral surface thereof and engaging said blocking means to respond to rotation of said rotary means only in the forward direction for imparting movement to said blocking means out of said blocking position to said release position, said unidirectional clutch means including clutch disengagement means to permit movement of said blocking means into the blocking position, whereby upon setting of said setting means into the selected position said clutch means actuate said blocking means and said drive remains blocked for a predetermined time period and said drive is released for the remainder of the time period during which the rotary means is turned in the forward direction.

8. A device as in claim 7 wherein said rotary means includes restraining means for causing uniform rotation of said rotary means at a predetermined speed.

9. A device as in claim 8 wherein said unidirectional clutch means includes a frictional element mounted for rotation with said rotary means, a first pivotally mounted lever for holding said blocking means, and a second lever pivotally mounted upon said first lever and in engagement with said frictional element.

10. A device as in claim 9 wherein said first pivotally mounted lever includes a stop member for limiting rotation of said second lever, means for biasing said second lever against said stop member whereby upon rotation of said frictional element in one direction said second lever is moved against the force of the biasing element away from the stop member and upon rotation of said frictional member in the other direction said second lever is rotated against said stop element and rotates said first lever.

11. A device as in claim 10 wherein said disengagement means includes a recess defined by said frictional element for receiving said second lever when said rotary means are rotated against said limit stop to allow said biasing means to move said first lever and said blocking member into the blocking position.

12. A device as in claim 11 wherein said frictional element includes a circumferential cam having a partially roughened circumferential surface.

13. In combination with a motion picture camera, a time delay drive release and stopping device comprising: a motion picture drive, an abutment member secured to the motion picture drive, a blocking member movable into position to stop motion of said drive, biasing means for urging the blocking member into the blocking position; rotary means including a limit stop, a dial member, a scale and a peripheral surface; said dial member being movable with respect to the scale and the limit stop, said dial member being mounted on said rotary means to move said rotary means in a backward direction and set said rotary means at a predetermined position to permit rotation of said rotary means by said means for rotating through a selected angle as determined by the dial with respect to the scale, escapement means connected between said rotary means and said means for rotating said rotary means for providing uniform rotation, said means for rotating said rotary means including a spring for urging the escapement in one direction, unidirectional clutch means engaged to said rotary means at the peripheral surface thereof to respond to rotation of said rotary means to rotary movement only in the forward direction for imparting movement to the blocking device out of the blocking position to a releasing position where it allows movement of the drive, said blocking member while moving from the blocking position to the releasing position being effective to block said drive until it reaches the releasing position whereby upon setting by means of the dial member said means for rotating causes said blocking member to lie against said abutment means for a predetermined finite time and releases said abutment means for the remaining time during which the rotary means is rotated in the forward direction.

14. A device as in claim 13 wherein said rotary means includes disengagement means for permitting movement of said blocking member by said biasing means into the blocking position upon said rotary means reaching the limit stop position.

15. A device as in claim 14 wherein said unidirectional clutch means includes a slip clutch member having a frictional surface, a first pivotally mounted lever, a second lever pivotally mounted on said first lever and in engagement with the frictional member, stop means for limiting rotation of said second lever with respect to the first lever, second biasing means for urging said second lever against said stop means whereupon movement of said frictional member in one direction said second lever is moved away from said stop means and moved with respect to the first lever and upon movement of said frictional element in the other direction both of said levers are moved, said blocking member being mounted to said first lever for movement by said first lever into and out of engagement with the abutment member.

References Cited in the file of this patent

UNITED STATES PATENTS

| | | |
|---|---|---|
| 1,161,618 | Coes | Nov. 23, 1915 |
| 2,333,972 | Bar | Nov. 9, 1943 |
| 2,468,541 | Bugeand | Apr. 26, 1949 |
| 2,503,736 | Hodges | Apr. 11, 1950 |
| 2,578,632 | Miller | Dec. 11, 1951 |
| 2,880,798 | Lohmeyer | Apr. 7, 1959 |